(12) United States Patent
How et al.

(10) Patent No.: US 10,262,689 B2
(45) Date of Patent: Apr. 16, 2019

(54) NESTING DISK SEPARATOR PLATES FOR USE IN HARD DISK DRIVES

(71) Applicant: INTRI-PLEX TECHNOLOGIES, INC., Santa Barbara, CA (US)

(72) Inventors: Leong Weng How, Singapore (SG); Ryan John Schmidt, Santa Barbara, CA (US); Michael John Stromberg, Santa Barbara, CA (US); Damon Douglas Brink, Ventura, CA (US)

(73) Assignee: INTRI-PLEX TECHNOLOGIES, INC., Santa Barbara, CA (US)

( * ) Notice: Subject to any disclaimer, the term of this patent is extended or adjusted under 35 U.S.C. 154(b) by 472 days.

(21) Appl. No.: 15/008,199

(22) Filed: Jan. 27, 2016

(65) Prior Publication Data

US 2016/0140996 A1    May 19, 2016

Related U.S. Application Data

(62) Division of application No. 13/893,107, filed on May 13, 2013, now Pat. No. 9,283,608.

(51) Int. Cl.
*G11B 23/00* (2006.01)
*B21D 22/02* (2006.01)
*B21K 1/76* (2006.01)
*G11B 33/14* (2006.01)

(52) U.S. Cl.
CPC .......... *G11B 23/0035* (2013.01); *B21D 22/02* (2013.01); *B21K 1/76* (2013.01); *G11B 33/148* (2013.01); *Y10T 29/49908* (2015.01); *Y10T 428/12368* (2015.01)

(58) Field of Classification Search
CPC . G11B 25/043; G11B 33/121; G11B 33/1446; G11B 33/08; G11B 5/4806; G11B 23/0035; G11B 33/148; B21K 1/76; B21D 22/02; Y10T 29/49908; Y10T 428/12368
See application file for complete search history.

(56) References Cited

U.S. PATENT DOCUMENTS

| | | |
|---|---|---|
| 3,205,936 A | 9/1965 | Katz |
| 3,377,700 A | 4/1968 | Cooley |
| 3,447,357 A | 6/1969 | Ho |
| 3,511,962 A | 5/1970 | Rolf |
| 3,590,917 A | 7/1971 | Huber et al. |
| 3,776,016 A | 12/1973 | Quinn et al. |
| 3,832,607 A | 8/1974 | Obenchain et al. |
| 4,422,236 A | 12/1983 | Ware et al. |
| 4,535,502 A | 8/1985 | Grass |

(Continued)

*Primary Examiner* — Brian E Miller

(57) ABSTRACT

A hard disk drive with a multiple disk stack normally utilizes disk separator plates near the disk surfaces to reduce wind induced vibrations in the disks and the read/write heads. The manufacturing methods currently used to make these separator plates, metal casting and machining, or injection molded plastic, or extruding and machining, or cold forging tends to be expensive and creates unwanted weight and bulk without the desired precision. Stamping disk separator plates from metal provides exceptional dimensional control at reduced cost, but cannot readily provide the thicknesses required. Stamping and extruding the offsets, or stamping and folding the offsets, is a manufacturing process that provides the required dimensions for the offsets, and dimensional control and reduced cost.

9 Claims, 10 Drawing Sheets

(56) References Cited

U.S. PATENT DOCUMENTS

| | | | |
|---|---|---|---|
| 5,805,385 A | 9/1998 | Koriyama | |
| 6,018,977 A | 2/2000 | Kanno et al. | |
| 6,064,547 A | 5/2000 | Wittig et al. | |
| 6,199,625 B1 | 3/2001 | Guerrero | |
| 6,477,000 B1* | 11/2002 | Pottebaum | G11B 5/6005 360/97.2 |
| 6,501,615 B1* | 12/2002 | Kelsic | G11B 33/08 360/265.6 |
| 6,717,768 B2 | 4/2004 | Kim | |
| 6,747,840 B2 | 6/2004 | Daniel et al. | |
| 6,781,791 B1* | 8/2004 | Griffin | G11B 5/5526 360/128 |
| 6,847,285 B2 | 1/2005 | Sirois et al. | |
| 6,888,697 B1* | 5/2005 | Oveyssi | G11B 25/043 360/97.16 |
| 7,146,713 B1 | 12/2006 | Ying | |
| 7,355,811 B1* | 4/2008 | Gifford | G11B 25/043 360/133 |
| 7,397,631 B1* | 7/2008 | Suwito | G11B 33/148 360/97.13 |
| 7,453,667 B2* | 11/2008 | Cho | G11B 25/043 360/97.19 |
| 7,508,623 B2* | 3/2009 | Gross | G11B 5/6005 360/97.14 |
| 7,721,790 B2 | 5/2010 | Sung | |
| 7,787,213 B1* | 8/2010 | Michael | G11B 33/148 360/97.13 |
| 8,194,345 B2 | 6/2012 | Kwon et al. | |
| 8,570,682 B2* | 10/2013 | Ichikawa | G11B 33/148 360/97.12 |
| 9,263,094 B2* | 2/2016 | Haidari | G11B 33/08 |
| 9,283,608 B2* | 3/2016 | How | B21D 22/02 |
| 9,406,333 B1* | 8/2016 | Horasart | G11B 19/2045 |
| 2002/0135933 A1* | 9/2002 | Harrison | G11B 5/6005 360/97.14 |
| 2006/0139793 A1 | 6/2006 | Ser et al. | |
| 2006/0169444 A1 | 8/2006 | Zurawel et al. | |
| 2008/0019039 A1 | 1/2008 | Ng et al. | |
| 2008/0100957 A1 | 5/2008 | Gross et al. | |
| 2008/0151420 A1* | 6/2008 | Lee | G11B 25/043 360/97.19 |
| 2012/0300344 A1 | 11/2012 | Brause et al. | |
| 2014/0335371 A1* | 11/2014 | How | B21D 22/02 428/597 |

* cited by examiner

NESTING DISK SEPARATOR PLATES FOR USE IN HARD DISK DRIVES

CROSS REFERENCE TO RELATED APPLICATIONS

This application is a division of application Ser. No. 13/893,107 filed May 13, 2013 for DISK SEPARATOR PLATES AND METHOD OF MAKING DISK SEPARATOR PLATES FOR HARD DISK DRIVES.

BACKGROUND OF THE INVENTION

1. Field of the Invention

The present invention relates to disk separator plates for reducing airborne noise and vibration in hard disk drives, and more particularly, pertains to methods of manufacturing disk separator plates.

2. Description of Related Art

It has been common practice for hard disk drives (HDD) to incorporate disk separator plates in order to reduce vibration caused by wind created by the rotating disk surfaces. This generates undesired noise in the hard disk drive assembly. It is thought that the disk separator plates should cover a maximum of the disk surfaces in order to minimize these vibration effects. It has been experimentally proven that the main airflow in a hard disk drive assembly, which is tangential to the circumferential edge of the rotating disks causes vortexes to be created between the airflow fluid layers, causing disk flutter and vibration of the magnetic reading heads during operation, thereby increasing noise and decreasing HDD performance.

The use of disk separator plates in hard disk drives has become common place. This increased use of disk separator plates in a hard disk drive increases the cost of the disk drive because of the increased raw materials required, and the secondary manufacturing operations required to make the disk separator plates, after initial stamping, forging, extrusion or casting.

FIG. 1 illustrates the environment in which disk separator plates of the present invention, also known as air damper plates disk damages, and anti disks, are utilized in a hard disk drive 9 which has a housing 11 with side walls 15 and 13 and a top enclosing the housing (not shown).

Contained within the housing 11 is the actuator drive assembly 17. An actuator 19, along with actuator arms 21 that carry read/write heads (22) are part of the drive assembly. A disk separator plate 25 is mounted over a top disk 23 to the side walls 15 and 13, or in any other convenient manner, to the housing 11 of hard disk drive 9. Besides being mounted over a disk stack 23, the disk separator plates are mounted between each of the disks in the disk stack, as will be explained hereinafter.

The shape and construction of the disk separator plates in the prior art are quite varied, although they have a common purpose of reducing airflow induced vibration.

FIG. 2 illustrates a disk separator plate 27 which is manufactured by casting and then machining to provide the correct thickness and flatness of the offset structures 31, 29, 32, and 33 which are used to hold the disk separator plate to the housing of a hard disk drive. Pins 30 and 34 are inserted into the casting or are machined from the casting as secondary operations. These pins mate with corresponding holes in the next separator plate in the stack, or in the drive base.

FIG. 3 illustrates a disk separator plate 35 that is manufactured by injection molding a plastic material. The plastic separator plate 35 has offset structures 37, 38 and 39 formed in the molding process.

FIG. 4 shows a disk separator plate 41 which is manufactured by extrusion and then milled or turned to reduce the main disk separator plate thickness 44 and establish the offset structures 42, 45, 46 required for mounting the disk separator plate to the housing of a hard disk drive. Boss 43 is milled from the extrusion to provide location alignment by nesting with an opposing separator plate or a drive base.

Each of these manufacturing processes has considerable shortcomings with respect to cost for the manufacturing methods used to produce metal disk separator plates. Furthermore, the ability to produce separator plates to precise dimensional control is difficult for each of the above described methods of manufacture.

The plastic injection molding process has special problems associated with it. The method produces voids and anisotropies in the product. The plastic plates are distorted when clamped. The plates are not as clean as required. The surface finish is not as smooth as required.

The major problem with the metal disk separator plates is the cost of manufacturing such plates.

FIG. 5 illustrates a side cross-section of a stack of disk separator plates 49, 51, 53, which are fastened to the enclosure 47 of a hard disk drive by a hold down bolt 55. The stack of disk separator plates illustrated is designed to cover the portions of the disks not swept by the use of the recording heads (not shown) which would rotate in the space between disk separator 49 and 51, 51 and 53, and 53 and the base 54 of housing 47. Hub 57 is the center around which the disks rotate.

The offsets 56, which are designed to provide the correct amount of separation between the disk separators 49, 51, and 53, and the base 54 of the hard disk drive are created as part of the separator plate during the manufacturing process. As can be seen by the structure of the offset 56 of separator plate 49, for example, the machining required after initial manufacturing is significant and increases the cost of each separator plate. The amount of metal required to make forged, fully machined, or extruded and machined disk separator plates is large because the starting thickness is at least that of the full offset height. The main plate thickness of the separator plate must be created by removing material.

Although flat stamped disk separator plates provide the best dimensional control, of all these manufacturing processes, at a minimum manufacturing cost, the stamping process cannot create the thickness, or material reduction required in a typical offset at the mounting points for the disk separator plate.

Accordingly, the present invention provides a method for manufacturing disk separator plates using disk stamping techniques which reduce raw material content and secondary manufacturing operations, while providing the necessary offset heights, required at the offset points, used for mounting the separator plates to the hard disk drive.

SUMMARY OF THE INVENTION

Making a disk separator plate by stamping and then extruding the offsets to a desired dimension, offset forming, or folding and making layers of material to obtain desired offset structure heights, provides a disk separator plate that is dimensionally controlled, has less debris, less weight and is less expensive to make than disk separator plates made by traditional methods. Extruded offsets are designed to nest into opposing counterbores to provide location alignment in-plane. This eliminates the need for additional alignment pins and holes, freeing up space and enabling more compact designs. Folded offsets also provide for precise alignment of the separator plates, as needed, by the extension of pins in the offset structures or by use of pins in the drive base. These pins mate with corresponding holes in mating parts.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
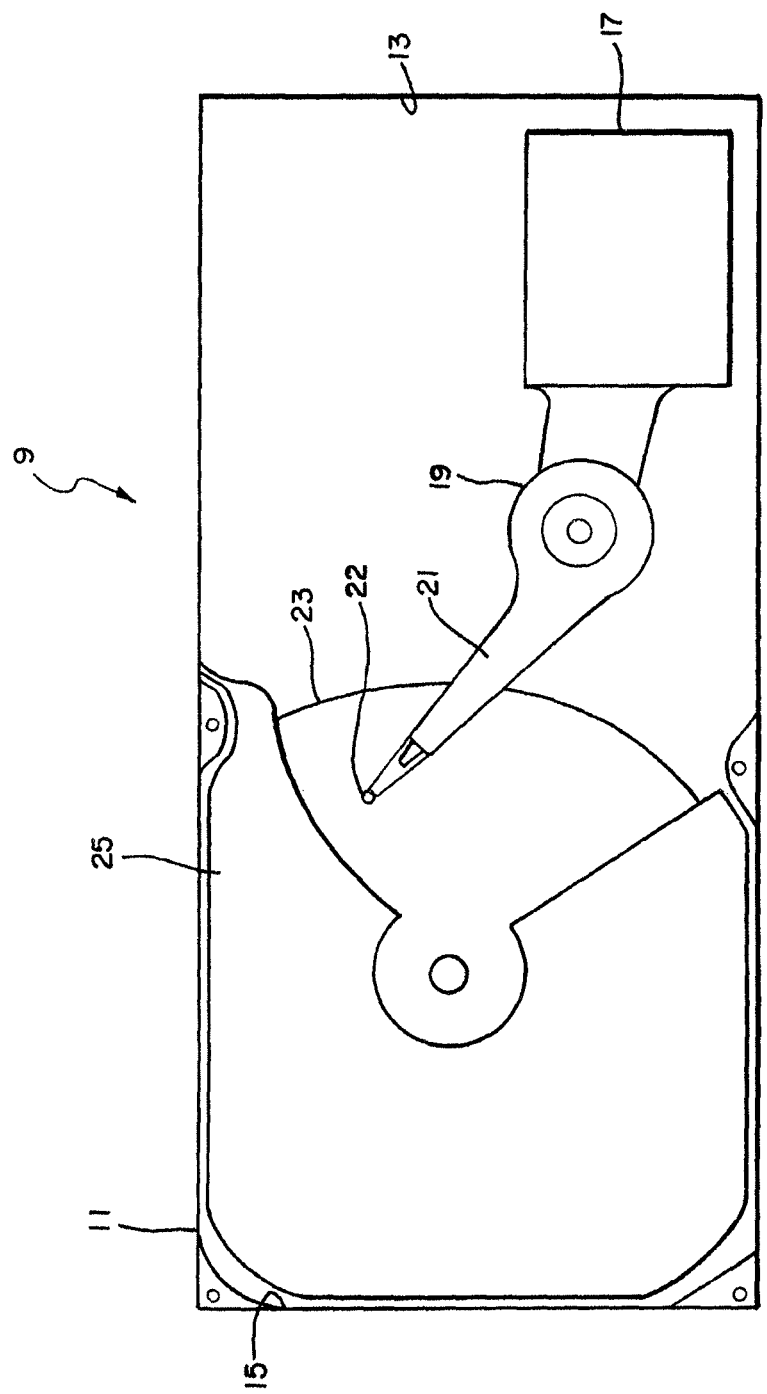
FIG. 1 is an illustration of a hard disk drive with a disk separator plate located therein.
Figure 2:
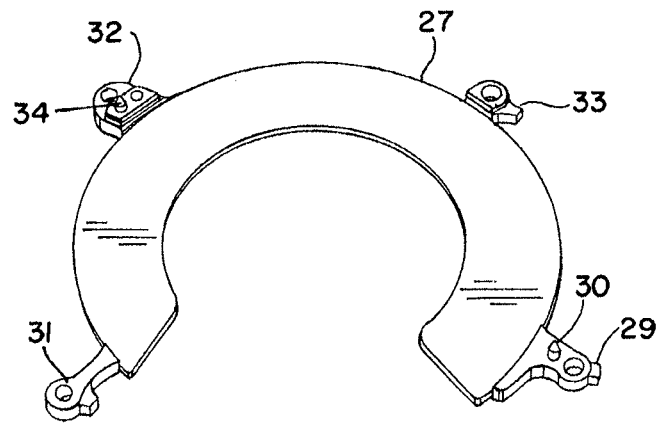
FIG. 2 is a perspective illustration of a prior art separator plate.
Figure 3:
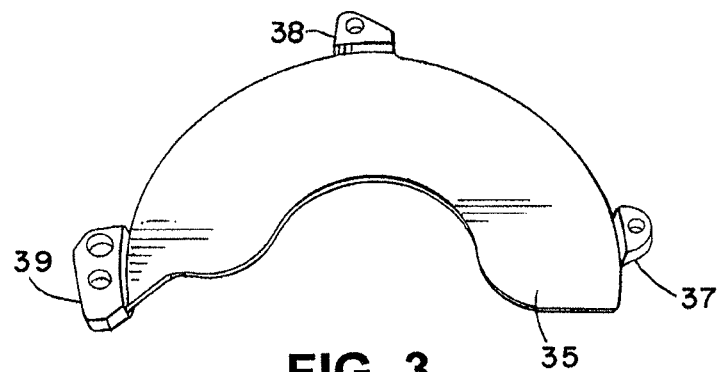
FIG. 3 is a perspective illustration of a prior art separator plate.
Figure 4:
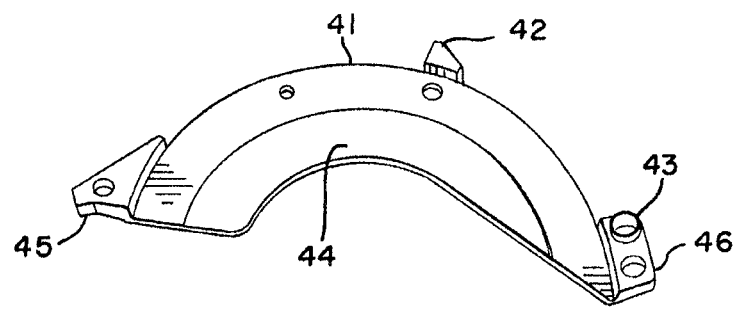
FIG. 4 is a perspective illustration of a prior art separator plate.
Figure 5:
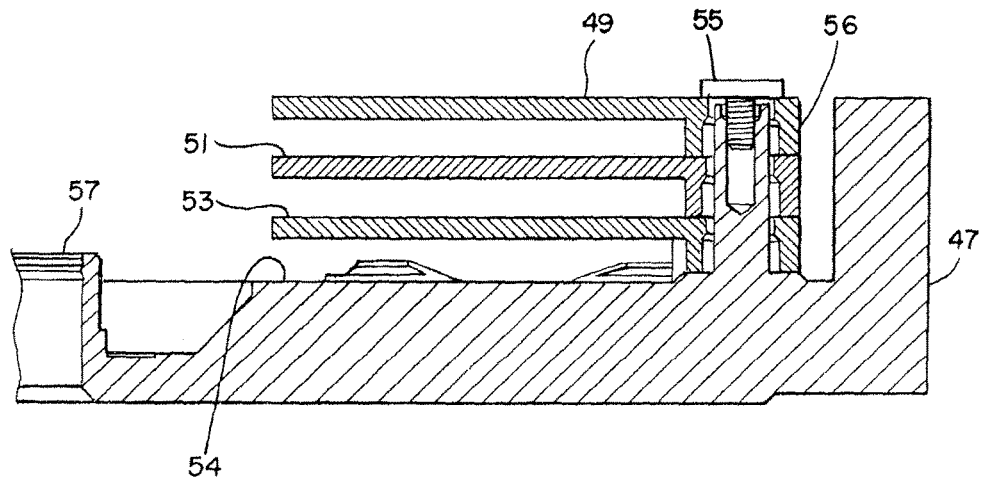
FIG. 5 is a side view illustration of a stack of prior art separator plates assembled in a hard disk drive.
Figure 6:
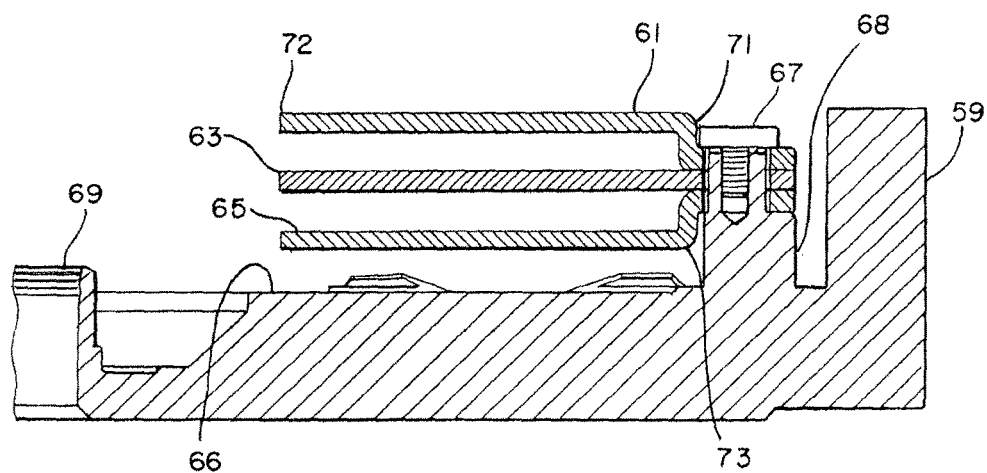
FIG. 6 is a side view of a hard disk drive with separator plates, according to the present invention.

FIG. 6 illustrates a stack of separator plates 61, 63, 65, manufactured according to the present invention, attached to a housing 59 of a hard disk drive. The upper separator plate 61 and the lower separator plate 65 create the required offset between separator plates 61 and 63, 63 and 65, and 65 and the base 66 respectively, by offset forming the ends of the separator plate 61 and 65 a certain distance to create the offset 71 for separator plate 61 and the offset 73 for separator plate 65. The center separator plate 63 is not bent and has no offset. The stack of separator plates 61, 63, and 65, is assembled on a standoff 68 which is part of the frame 59 of the hard disk drive housing. The stack is fastened down by a fastening bolt 67.

The disks (not shown) that rotate in the spaces between the separator plates 61 and 63, 63 and 65 and 65 and the base 66, are attached to a rotating spindle 69, in a manner well known.

Manufacturing the separator plates of FIG. 6 by stamping and then forming the ends to create a standoff has proven to be a less expensive method of manufacturing, while at the same time producing a more accurately dimensioned disk of separator plates. Moreover, much less raw material is required since the raw material thickness is close to the smaller plate tip thickness 72, instead of the larger offset thickness 71.

Figure 7:
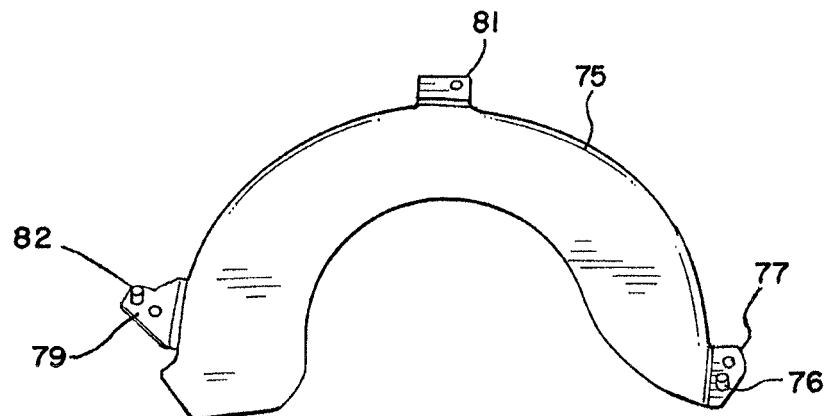
FIG. 7 is a perspective illustration of a disk separator plate according to the present invention.

FIG. 7 illustrates a disk separator plate manufactured by stamping the shape of the plate 75 out of a preferred metal such as aluminum, along with the tabs 77, 81, 79. The offset on the tabs is formed by offset forming, essentially two right angle bends. Pins 76 and 82 are extruded during stamping to provide location alignment.

Figure 8:
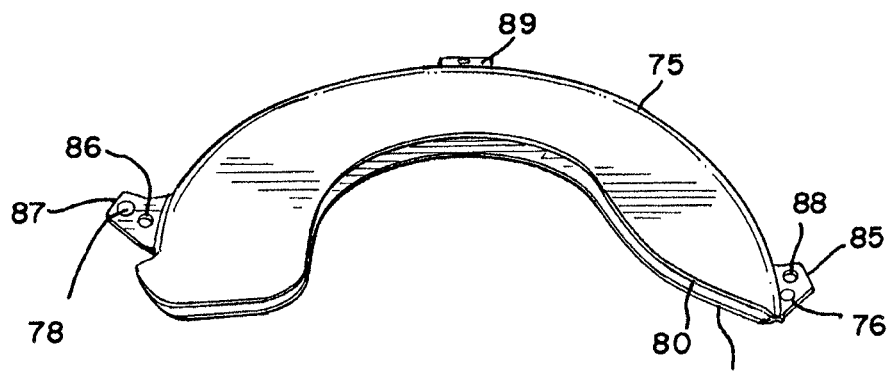
FIG. 8 is a perspective illustration of disk separator plates according to the present invention.

FIG. 8 illustrates two disk separator plates mounted together. A top plate 75 is mounted to a bottom plate 83 to create a gap 80 within which a disk rotates. The tabs 85, 89, and 87 are joined together so that the alignment pins and holes 76 and 78, line up.

Figure 9:
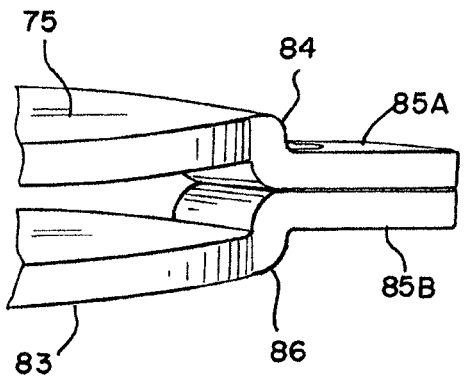
FIG. 9 is a perspective illustration of separator plate offsets, according to the present invention.

FIG. 9 schematically illustrates the offset bends 84 and 86 in the upper disk separator plate 75 and the lower disk separator plate 83 that create the respective tabs 85A and 85B. These tabs are mated together to form tab 85.

Figure 10:
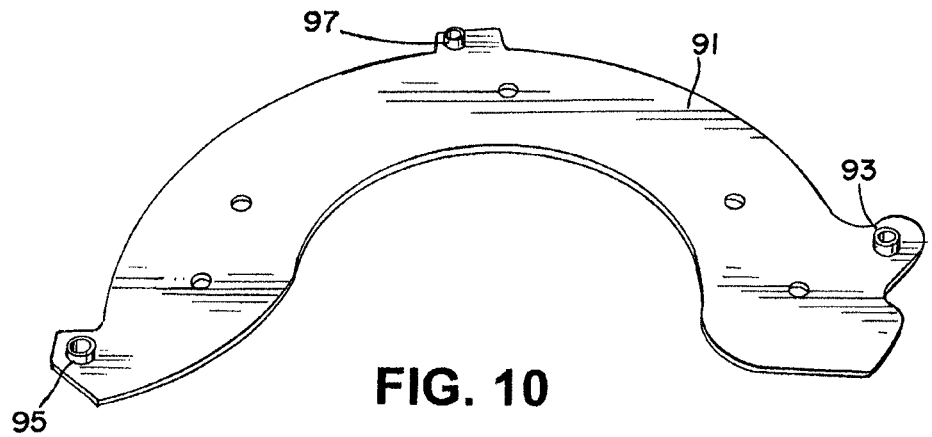
FIG. 10 is a perspective illustration of a disk separator plate, according to the present invention.
Figure 11:
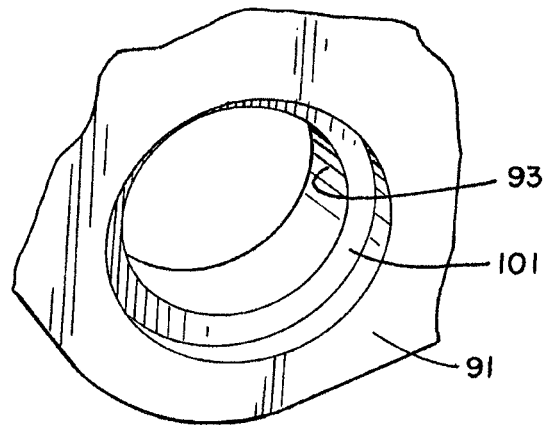
FIG. 11 is a perspective illustration of the counterbore in a disk separator plate, according to the present invention.

Besides creating offsets in the stamped plates by offset forming, the present invention creates offsets by extrusion from thinner raw material. Extrusion of an offset boss is illustrated in FIG. 10, which shows a disk separator plate 91 having tabs with extruded offset bosses 93, 97, and 95 which create the offset structure. It is contemplated that the top face of the disk separator plate around the perimeter of the offset boss 93 has a counterbore 101 with a diameter slightly larger than the extruded boss (FIG. 11) to provide location alignment with the separator plate above.

Figure 12:
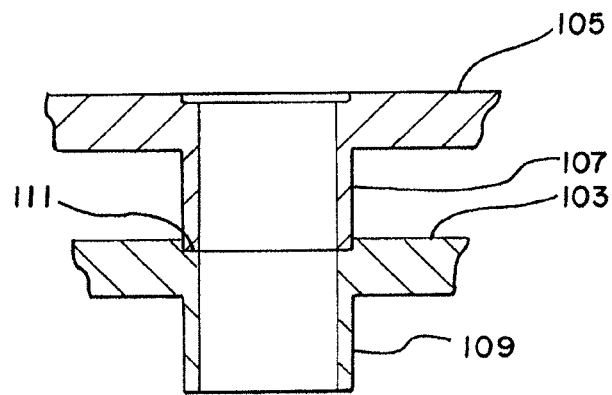
FIG. 12 is a schematic illustration of the nesting of two disk separator plates, according to the present invention.

FIG. 12 schematically illustrates how two extruded offset bosses nest. The top plate 105 with offset boss 107 is supported by the bottom plate 103 with offset boss 109, nesting offset boss 107 in the counterbore 101.

It is contemplated that rather than creating a counterbore in the face of a separator plate around each offset boss, the extruded offsets could be made larger in diameter than the apertures through the boss.

Figure 13:
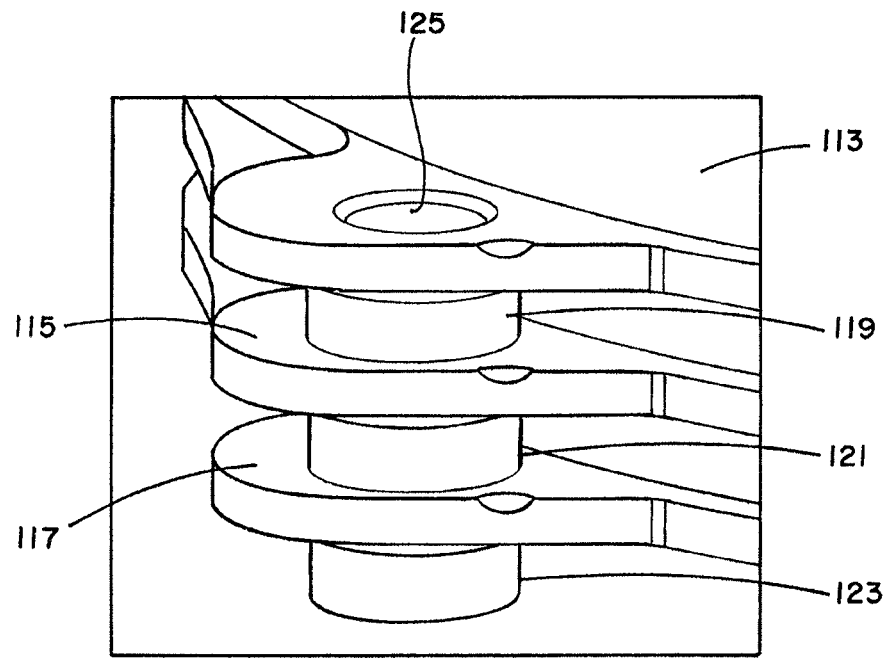
FIG. 13 is a perspective illustration of stacked disk separator plates, according to the present invention.

FIG. 13 illustrates three separator plates 113, 115, and 117 each having extruded bosses as offsets 119, 121, and 123 respectively. The aperture 125 through offset boss 119, for example, has a smaller diameter than the external diameter of offset boss 119, as do each of the other separator plates 115 and 117. The result is the three separator plates can be simply stacked one on top of the other, with the bottom of the boss of one plate 119 sitting on the top surface of disk separator plate 115, and the bottom of offset boss 121 sitting on the top surface of separator plate 117.

Figure 14:
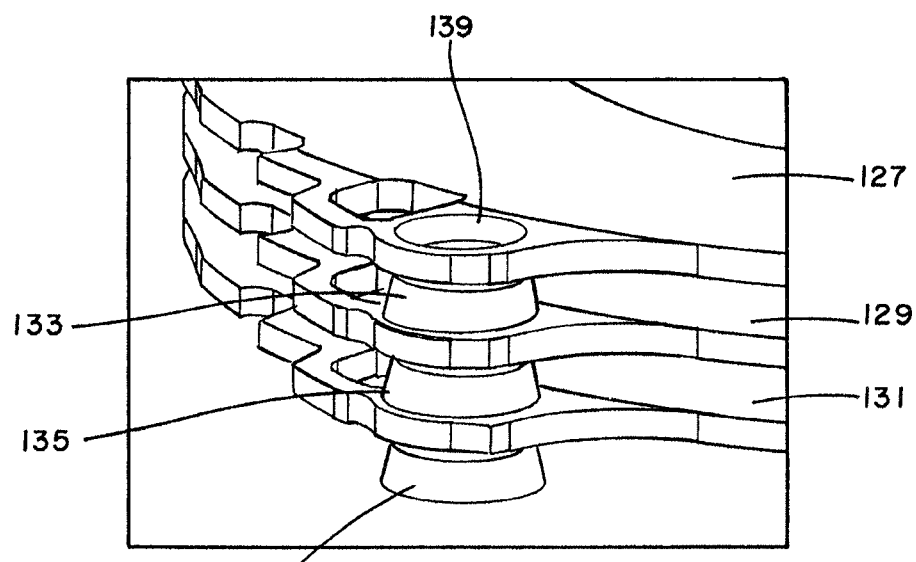
FIG. 14 is a perspective illustration of stacked disk separator plates, according to the present invention.

A slight variation of this construction is illustrated in FIG. 14, which shows separator plates 127, 129, and 131 having offset bosses 133, 135, and 137 that are extruded and then flared in a slightly upside-down V-shaped cross section with the top of the boss being smaller in diameter than the bottom. Thus, separator plate 127 with a V-shaped extruded offset boss 133 has a larger diameter at its base than at the top. The aperture 139 which passes through boss 133 has a smaller diameter than the top of boss 133. As a result, the separator plates 127, 129, 131 all have the same footprint and each sit on top of the separator plate below it. These V-shaped offset bosses allow use of the full offset height when large aperture 139 lead-in radii are required to generate enough material volume to create the required offset height. Without the flare, bosses 133 and 135 would recess into the apertures and reduce the stack height.

Figure 15:
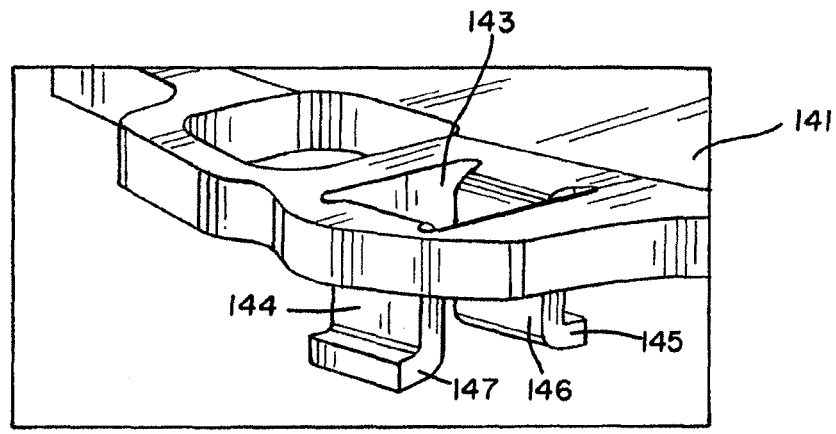
FIG. 15 is a perspective illustration of a disk separator plate, according to the present invention.

The present invention also contemplates the creation of offsets in stamped metal disk separator plates by double internal tabs. As shown in FIG. 15, a disk separator plate 141 has the tab internally cut 143 to create legs 144 and 146. These legs are then bent again at top surface 141 of the disk to create the offset and bent at the end of the legs to create feet 145, 147. These feet extend beyond the diameter of the aperture 143.

Figure 16:
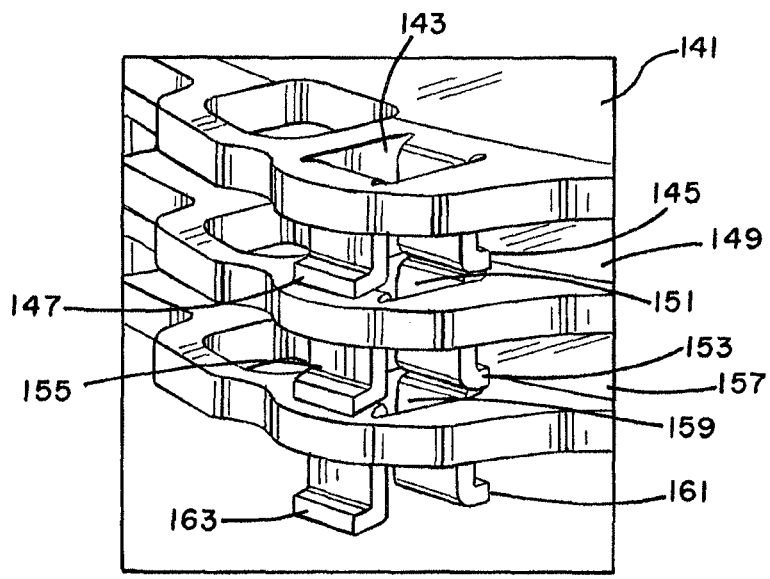
FIG. 16 is a perspective illustration of stacked disk separator plates, according to the present invention.

This permits stacking of the disk separator plates as illustrated in FIG. 16. Disk separator plate 141 is stacked on disk separator plate 149, which is, in turn, stacked on disk separator plate 157. The offset legs of disk separator plate 141 rest on the top surface of disk separator plate 149 because of the feet 147 and 145 created by the bend in the legs 144, 146. The feet of disk separator plate 149, feet 155 and 153 sit on the top surface of disk separator plate 157. The feet 161, 163 of disk separator plate 157, sit on top of another disk separator plate, or a fastening protrusion on the frame of a disk drive.

Figure 17:
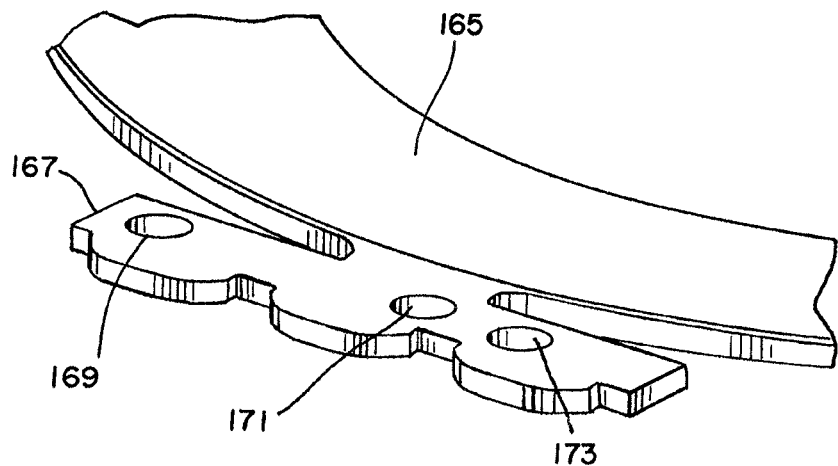
FIG. 17 is a perspective illustration of a disk separator plate, according to the present invention, before an offset structure is formed.
Figure 18:
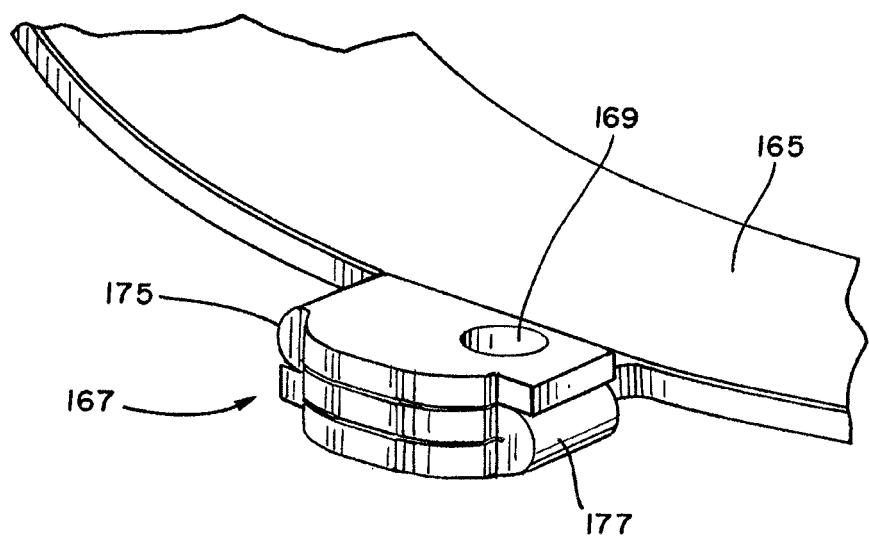
FIG. 18 is a perspective illustration of a disk separator plate, after the offset structure is formed.

The present invention also contemplates the creation of offsets by folding tabs in parallel. As illustrated in FIG. 17, a disk separator plate 165 is stamped from a metal to create the shape of the disk separator plate, as well as a tab configuration 167. This tab configuration will create the offset required. Two overlapping folds accurately align the apertures 169, 171, and 173 in the tab 167. FIG. 18 shows the tab 167 after the parallel folds are completed. Aperture 173 is on the bottom, aperture 171 is in the middle, as the result of first bend 177. Aperture 169 is on top, as the result of second bend 165. Aperture 169 can also be pierced through all three layers after folding. Offset height can be reduced as required by corning the three folded tabs during stamping.

The present invention also contemplates the creation of offsets in a stamped disk separator plate by attaching a separate piece formed around a fastening tab of the stamped separator plate.

Figure 19:
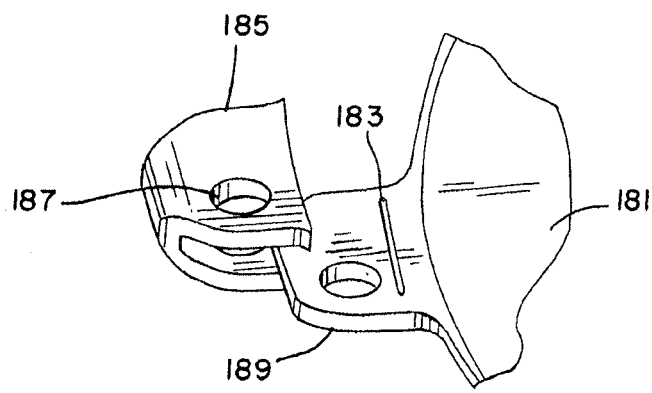
FIG. 19 is a perspective illustration of a disk separator plate with an alternate offset, according to the present invention.
Figure 20:
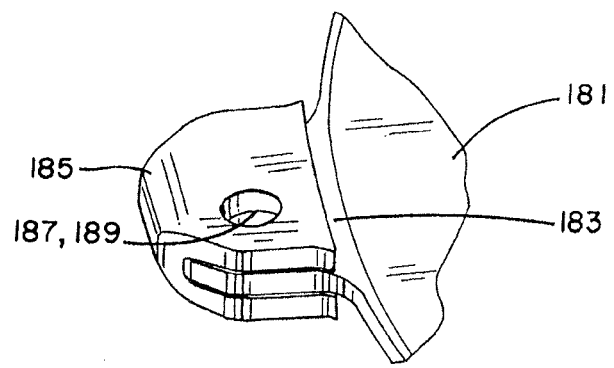
FIG. 20 is a perspective illustration of the offset assembly of FIG. 19.

FIG. 19 illustrates a disk separator plate 181 having a fastening tab with an aperture 189 and a ridge 183 on the tab. A bent clip 185, having an aperture 187 in the top and bottom legs of the clip, is formed to fit over the tab so the apertures 187 and 189 align, as illustrated in FIG. 20. Upon alignment, the clip 185 is crimped and/or corned to the tab of disk separator plate 181 to create the required offset height, as illustrated in FIG. 21.

Figure 21:
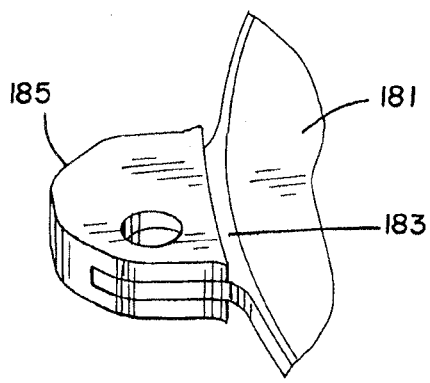
FIG. 21 is a perspective illustration of the offset assembly of FIG. 20 in a finished state.
Figure 22:
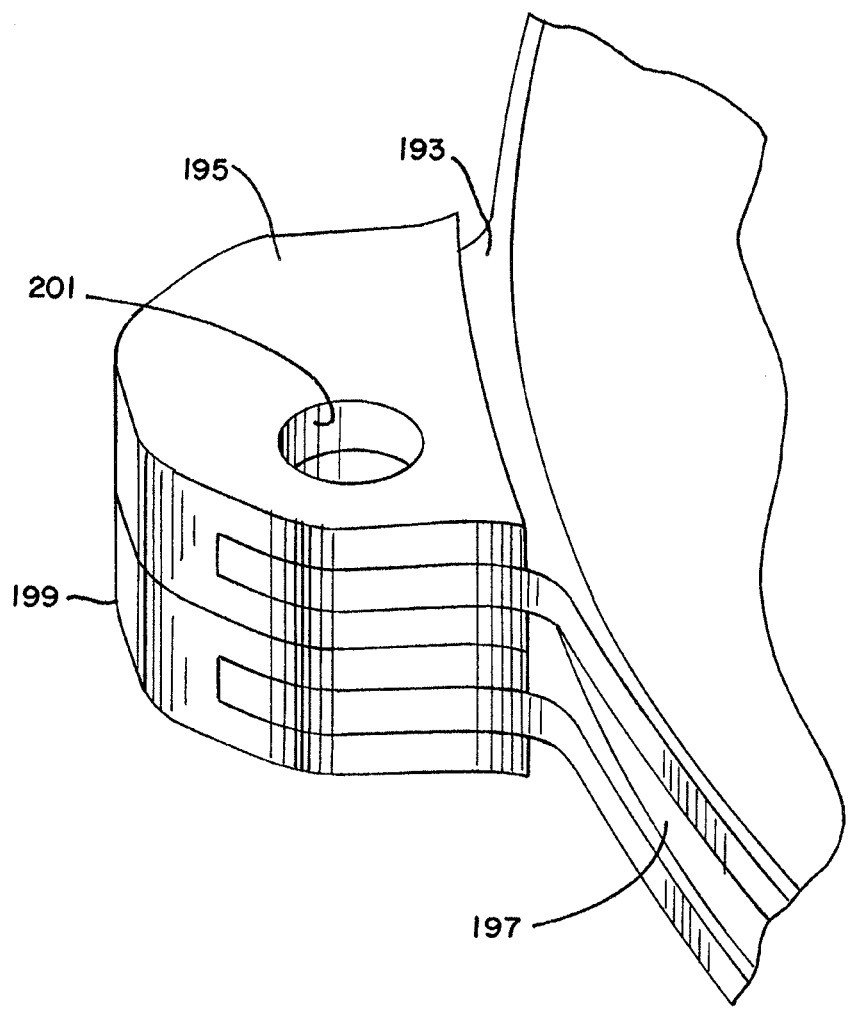
FIG. 22 is a perspective illustration of stacked disk separator plates utilizing the offset assembly of FIG. 21.

Disk separator plates manufactured in FIGS. 19-21 can be stacked as shown in FIG. 22. Disk separator plate 193 with its offset clip 195 is stacked on top of disk separator plate 197 with its offset 199. The apertures 201 of both offsets align with considerable precision. Disk separator plates using an attached offset can be easily stacked to any required height.

What is claimed is:

1. A disk separator plate for hard disk drives, comprising:
   a separator plate having a top and bottom surface and external edge with multiple mounting apertures in the separator plate, stamped from a single sheet of metal; and
   an extruded offset boss surrounding each one of the plurality of mounting apertures extending from the top surface of the separator plate for a predefined distance.

2. The disk separator plate of claim 1 wherein each extruded offset boss has a larger diameter at the predefined distance than at the surface of the separator plate.

3. The disk separator plate of claim 1 further comprising a counterbore of the inner diameter of the offset boss for a predefined distance at the bottom surface of the separator plate, the counterbore sized to receive the outer diameter of an extruded offset boss from another separator plate.

4. A disk separator plate for hard disk drives, comprising:
   a separator plate having a top and bottom surface and external edge with a plurality, of tabs at predetermined locations on the external edge of the separator plate, each tab having a top and bottom surface and a mounting aperture, the separator plate stamped from a single sheet of metal; and
   an extruded offset boss surrounding each one of the mounting apertures in the plurality of tabs extending from a top surface of the tabs for a predefined distance.

5. The disk separator plate of claim 4 wherein each extruded offset boss has a larger diameter at the predefined distance than at the top surface of the tab.

6. The disk separator plate of claim 4 further comprising a counterbore at the inner diameter of the offset boss for a predefined distance at the bottom surface of the tab, the counterbore sized to receive the outer diameter of an extruded offset boss from another separator plate.

7. The disk separator plate of claim 4 wherein the offset is formed by bending each tab a predefined distance from the edge to form an offset of a center height.

8. The disk separator plate of claim 4 wherein the offset is formed by bending each tab to fold over itself to form an offset of a certain height.

9. The disk separator plate of claim 4 wherein the offset is formed by clamping a U-shaped piece on each tab to form an offset of a certain height.

* * * * *